(12) United States Patent  
Huang et al.

(10) Patent No.: US 9,043,171 B2  
(45) Date of Patent: May 26, 2015

(54) ELECTRONIC DEVICE AND METHOD FOR CALCULATING EFFICIENCY OF SIMULATIVE POWER SUPPLY SYSTEM

(75) Inventors: Tsung-Sheng Huang, New Taipei (TW); Chun-Jen Chen, New Taipei (TW); Duen-Yi Ho, New Taipei (TW); Wei-Chieh Chou, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 452 days.

(21) Appl. No.: 13/596,063

(22) Filed: Aug. 28, 2012

(65) Prior Publication Data

US 2013/0204558 A1 Aug. 8, 2013

(30) Foreign Application Priority Data

Feb. 6, 2012 (TW) .................................. 101103719

(51) Int. Cl.
*G01R 21/00* (2006.01)
*G06F 17/50* (2006.01)
*G01R 21/06* (2006.01)

(52) U.S. Cl.
CPC ........ *G06F 17/5036* (2013.01); *G06F 17/5063* (2013.01); *G06F 2217/78* (2013.01)

(58) Field of Classification Search
CPC .................................................. G06F 2217/78
USPC ....................................................... 702/60–65
See application file for complete search history.

(56) References Cited

U.S. PATENT DOCUMENTS 7,002,265 B2 * 2/2006 Potega .......................... 307/149
2010/0185336 A1 * 7/2010 Rovnyak et al. .............. 700/287

* cited by examiner

*Primary Examiner* — Phuong Huynh
(74) *Attorney, Agent, or Firm* — Novak Druce Connolly Bove + Quigg LLP

(57) ABSTRACT

A method for calculating efficiency of a power supply system includes: displaying a parameter selection interface on the display unit for selecting power supply parameters and transmission line parameters. Obtaining power supply parameters and transmission line parameters selected by the user via the parameter selection interface when determining the user has finished the selection. Determining a efficiency of a selected power supply of the power supply parameters according to the relationship table, and calculating a sum efficiency according to the obtained power supply parameters and the transmission line parameters and the efficiency of the selected power supply. And calculating a total efficiency of the power supply system according to each sum efficiency when determining that all of the power supplies of the power supply system have been selected.

14 Claims, 3 Drawing Sheets

ELECTRONIC DEVICE AND METHOD FOR CALCULATING EFFICIENCY OF SIMULATIVE POWER SUPPLY SYSTEM

BACKGROUND

1. Technical Field

The present disclosure relates to electronic devices and, particularly, to an electronic device and a method for calculating efficiency of a simulative power supply system.

2. Description of Related Art

Usually, electronic devices are powered by external power supplies or internal power supplies. When choosing a power supply for an electronic device, it is needed to design a simulative power supply and evaluate the simulative power supply. An important item of evaluating the simulative power supply is the efficiency of the simulative power supply, therefore, it is necessary to calculate the efficiency of the simulative power supply, and select a suitable power supply for the electronic device by considering the advantages ad disadvantages of the power supply. However, the common device and method for calculating the efficiency of the simulative power supply are complex.

Therefore, an electronic device and a method for calculating efficiency of the simulative power supply are needed.

BRIEF DESCRIPTION OF THE DRAWINGS

Many aspects of the present disclosure are better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Embodiments of the present disclosure will be described with reference to the accompanying drawings.

Figure 1:
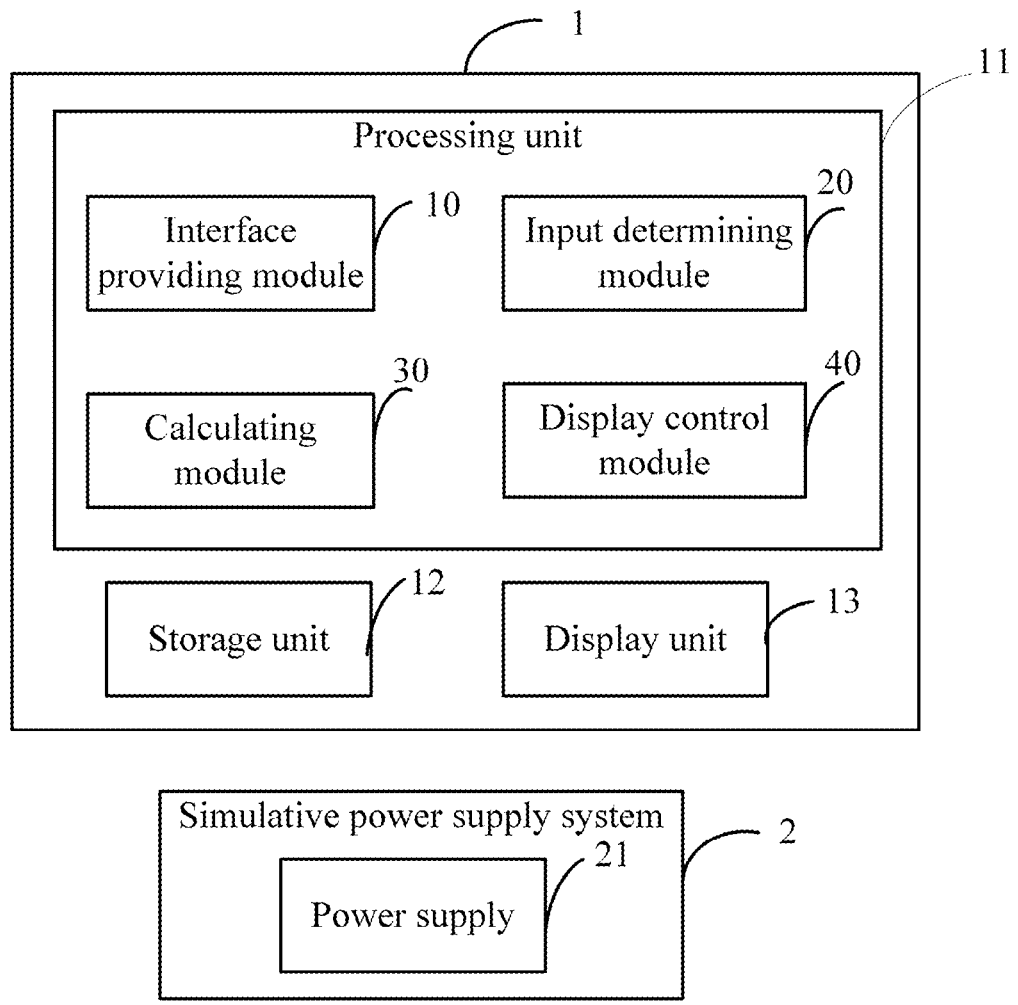
FIG. 1 is a block diagram of an electronic device for calculating power supply efficiency, in accordance with an exemplary embodiment.
Figure 2:
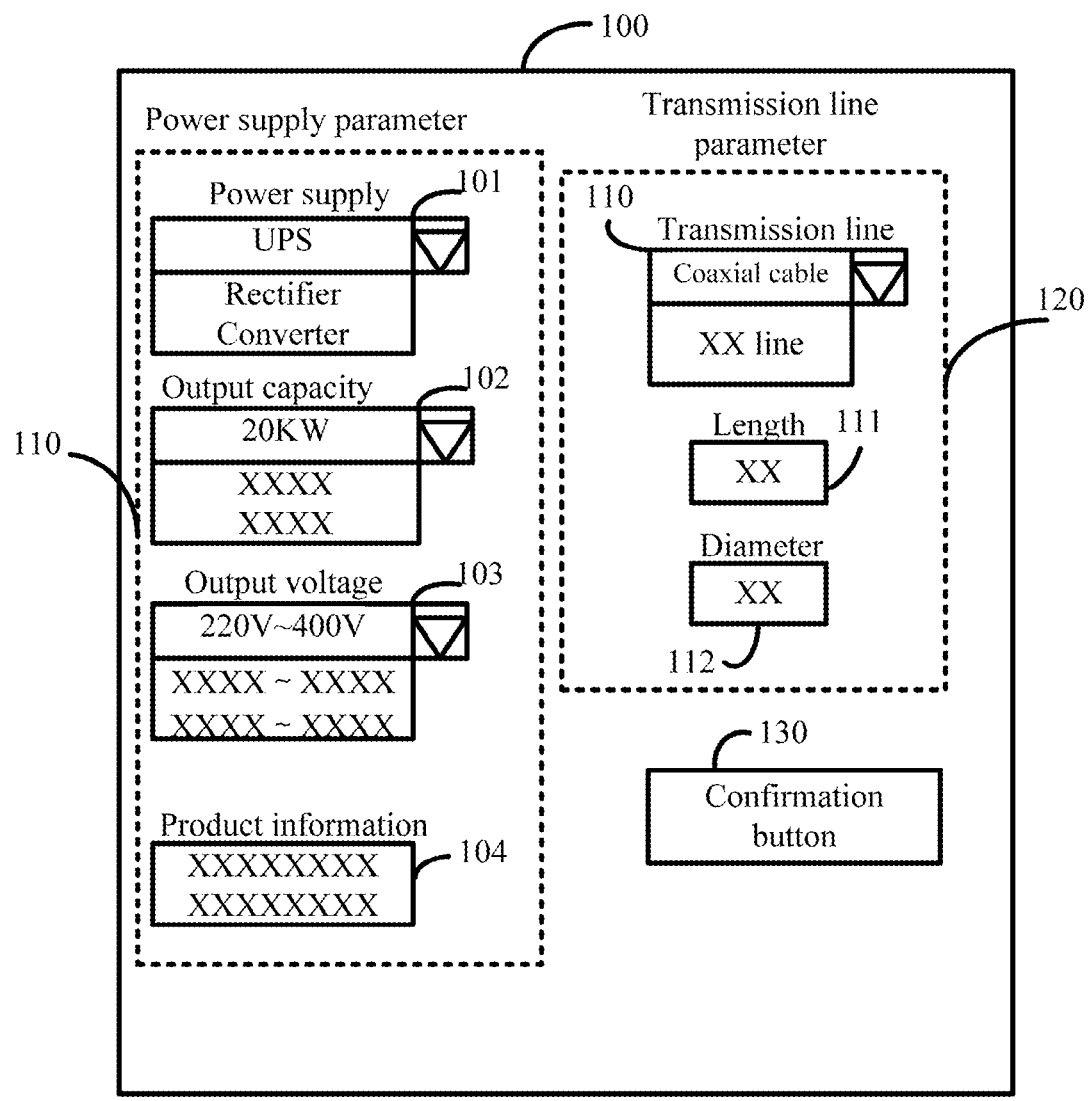
FIG. 2 is a schematic diagram of a parameter selection interface provided by the electronic device of FIG. 1, in accordance with an exemplary embodiment

Referring to FIGS. 1 and 2, an electronic device 1 for calculating efficiency of a simulative power supply system 2 is illustrated. The electronic device 1 includes a processing unit 11, a storage unit 12, and a display 13. The electronic device 1 can be a computer, a mobile phone, and an electronic reader, for example. In the embodiment, the simulative power supply system 2 includes at least one power supply 21 connected in series. The electronic device 1 calculates the efficiency of the simulative power supply system 2 to be designed.

The storage unit 12 stores a relationship table. The relationship table defines relationships between a number of power supplies and efficiencies associated with each of the power supplies. Such as, the efficiency of an uninterrupted power supply (UPS) is 90%, the efficiency of a rectifier is 88%.

The processing unit 11 includes an interface providing module 10, an input determining module 20, a calculating module 30, and a display control module 40.

The interface providing module 10 is used to display a parameter selection interface 100 as shown in FIG. 2 on the display 13 in response to user operation. The parameter selection interface 100 includes a power supply parameter selection area 110 for selecting power supply parameters and a transmission line parameter selection area 120 for selecting transmission line parameters.

As shown in FIG. 2, the power supply parameter selection area 110 includes a power supply selection box 101, an output power selection box 102, and an output voltage selection box 103. The transmission line parameter selection area 120 includes a transmission line selection box 110 and a number of parameter selection boxes. The transmission line selection box 110 is provided for selecting different types of transmission lines, and the parameter selection boxes are provided for selecting transmission line parameters corresponding to the selected transmission line. In detail, when the transmission line selected by the user is different, the parameter selection boxes corresponding to the selected transmission lines are different. For example, as shown in FIG. 2, when the type of the transmission line selected by the user is a coaxial cable, the corresponding parameter selection boxes include a length selection box 111, a diameter selection box 112, and a conductivity selection box 113. If the user selects another type of transmission line, the corresponding parameter selection boxes would be different.

The power supply selection box 101 is provided for selecting different types of power supplies 21. For example, the user can select a UPS, a rectifier, or a converter via the power supply selection box 101. The output power selection box 102 is provided for selecting different output powers of the selected power supply 21, such as 20 kilowatt (KW), and the output voltage selection box 103 is provided for selecting the output voltage of the selected power supply 21, such as 200 volts. In the embodiment, the transmission line currently selected by the user is used to connect to the power supply currently selected by the user. Then the parameter selection interface 100 is provided for selecting each power supply of the simulative power supply 2 and each transmission line connected to each power supply.

Accordingly, the power supply parameters selected by the user include the type of the power supply 21, the output power of the selected power supply 21, and the output voltage of the selected power supply 21. The transmission line parameters include the type of the transmission line, and the corresponding parameters of the selected transmission line, such as the length, the diameter, and the conductivity.

In the embodiment, the parameter selection interface 100 also includes a confirmation button 130. The input determining module 20 determines the user has finished the selection when detecting the confirmation button 120 has been operated by the user, and obtains the power supply parameters and the transmission line parameters selected by the user via the power supply parameter selection area 110 and the transmission line parameter selection area 120. In the embodiment, the confirmation button 130 is a virtual button and is displayed on the parameter selection interface 100. In another embodiment, the confirmation button 130 can be a mechanical button set on a suitable position of the electronic device 1.

The calculating module 30 is used to determine the efficiency of the selected power supply according to the relationship table, and calculate a sum efficiency of the selected power supply and the transmission line according to the selected power supply parameters, the selected transmission line parameters, and the efficiency of the selected power supply. In the embodiment, the sum efficiency of the selected power supply and the transmission line is the sum of the efficiency of the selected power supply and the efficiency of the selected transmission line. s In detail, the calculating module 30 calculates a resistance value R of the transmission line according to the parameters. The parameters include the length, the diameter, and the conductivity, for example, as selected by the user via the transmission line parameter selection area 120. In addition, calculates the loss of the transmission line according to the output voltage selected by the user via the output voltage selection box 103 and the resistance value R of the transmission line. That is, assume the output voltage is U, the loss of the transmission line is Ps, then the loss of the transmission line is: $Ps=U^2/R$. The calculating module 30 also multiplies the output power selected by the user and the efficiency corresponding to the power supply 21 to obtain a factual power of the power supply 21 selected by the user. Finally, the calculating module 30 subtracts the loss Ps of the transmission line from the factual power of the selected power supply 21 to obtain an efficient power, and divides the output power by the efficient power to obtain the sum efficiency of the selected power supply and the corresponding transmission line.

The display control module 40 is used to display the sum efficiency of the selected power supply and the transmission line on the display unit 13. The display control module 40 is also used to display a prompt to prompt the user whether to select a next power supply 21 or not, and determine whether it is needed to select a next power supply 21 according to the user's selection. When the display control module 20 determines that it is needed to select a next power supply 21 according to the user's selection, the input determining module 20 and the calculating module 30 execute the corresponding function as described above. Namely, the user selects new power supply parameters and transmission line parameters again via the parameter selection interface 100, the input determining module 20 obtains the power supply parameters and the transmission line parameters selected by the user when detecting the confirmation button 130 has been operated by the user once again. The calculating module 30 calculates a sum efficiency of the next selected power supply and transmission line according to the efficiency of the next selected power supply and the loss of the corresponding transmission line accordingly.

When the display control module 20 determines that it is not needed to select a next power supply 21 according to the user's selection, the calculating module 30 determines that all of the power supplies 21 of the power supply system 2 has been selected, and calculates a total efficiency of the simulative power supply system 2 according to the sum efficiencies of each selected power supply and transmission line. In detail, the calculating module 30 multiplies the sum efficiencies of each selected power supply and transmission line to obtain the total efficiency of the simulative power supply system 2. The display control module 40 is also used to display the total efficiency of the simulative power supply system 2 on the display unit 13.

In the embodiment, the parameter selection interface 100 also includes a product information box 104. The product information box 104 is used to display relative information of the selected power supply 21, such as a manufacturer, and a manufacture date.

Therefore, when the user would design a power supply system 2 for a device (not shown), the user can select the parameters of the power supplies 21 and the parameters of the corresponding transmission lines via the electronic device 1, and then the electronic device 1 calculates the efficiency of the simulative power supply system 2 according to the selected parameters as described above.

Figure 3:
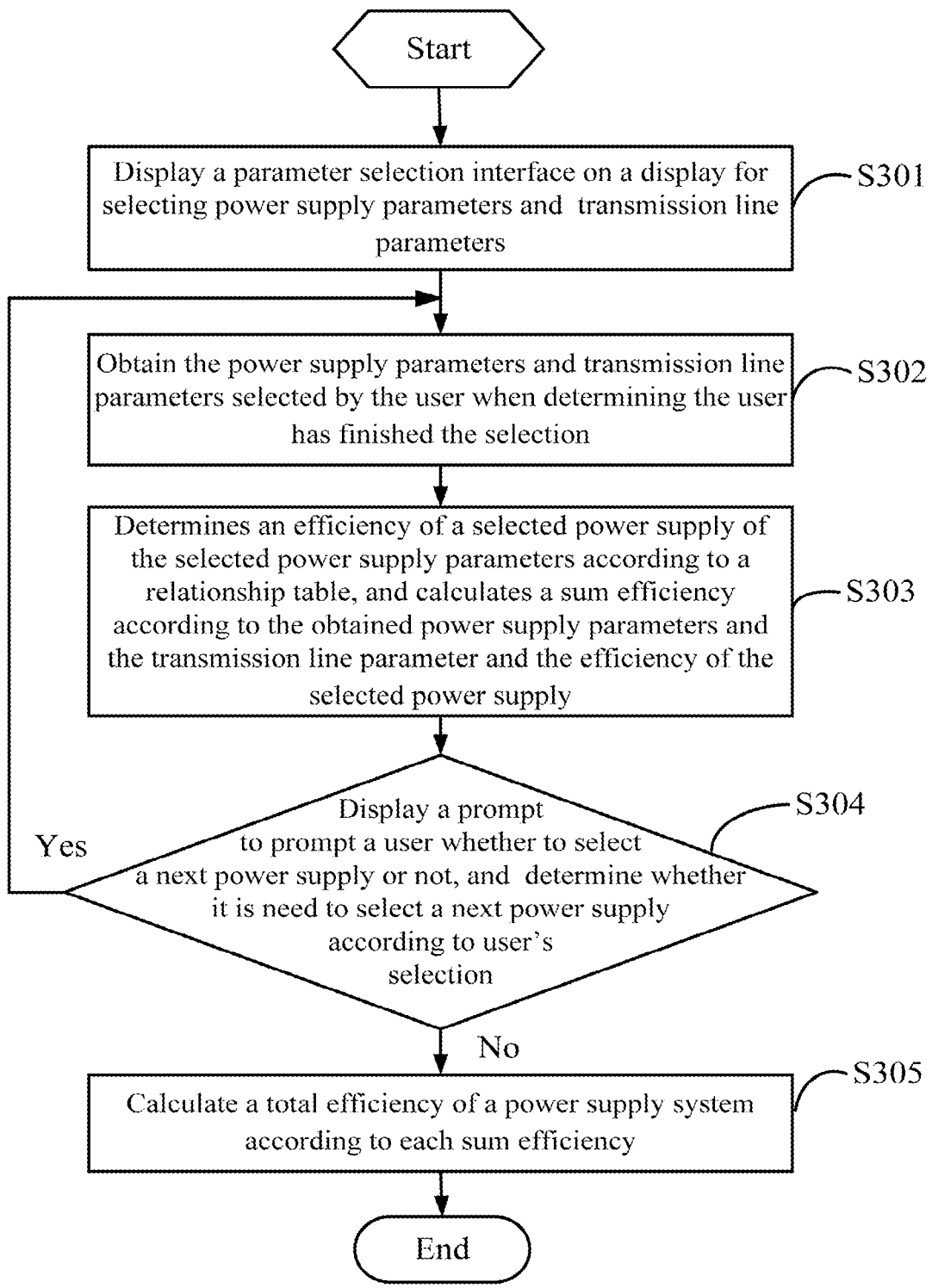
FIG. 3 is flowchart illustrating a method for calculating power supply efficiency, in accordance with an exemplary embodiment.

Referring to FIG. 3, a flowchart illustrating a method for calculating efficiency of a power supply system is shown. The method is applied in the electronic device 1 as shown in FIG. 1. In step S301, the interface providing module 10 displays a parameter selection interface 100 on the display 13 for selecting the power supply parameters and the transmission line parameters. Therein, the parameter selection interface 100 includes a power supply parameter selection area 110 and a transmission line parameter selection area 120. The power supply parameter selection area 110 includes a power supply selection box 101, an output power selection box 102, and an output voltage selection box 103. The transmission line parameter selection area 120 includes a transmission line selection box 110 and a number of parameter selection boxes corresponding to a type of a transmission line selected by the user via the transmission line selection box 110. Accordingly, the power supply parameters selected by the user include the type of the power supply 21, the output power of the selected power supply 21, and the output voltage of the selected power supply 21. The transmission line parameters include the type of the transmission line, and the corresponding parameters of the transmission line, such as the length, the diameter, and the conductivity.

In step S302, the input determining module 20 obtains the power supply parameters and the transmission line parameter selected by the user via the parameter selection interface 100 when determining the user has finished the selection. In the embodiment, the input determining module 20 determines the user has finished the selection when detecting a confirmation button 130 has been operated by the user.

In step S303, the calculating module determines the efficiency of the selected power supply of the power supply parameters according to the relationship table, and calculates a sum efficiency of the selected power supply and transmission line according to the power supply parameters and the transmission line parameter obtained by the input determining module 20 and the efficiency of the selected power supply.

In detail, the calculating module 30 calculates a resistance value R of the transmission line according to the parameter, such as the length, the diameter, and the conductivity selected by the user via the transmission line parameter selection area 120, and calculates the loss of the transmission line according to the output voltage selected by the user via the output voltage selection box 103 and the resistance value R of the transmission line. That is, define the output voltage is U, the loss transmission line is Ps, then the loss of the transmission line is: $Ps=U^2/R$. The calculating module 30 also multiplies the output power selected by the user and the efficiency corresponding to the power supply 21 to obtain a factual power of the power supply 21 selected by the user. Finally, the calculating module 30 subtracts the loss Ps of the transmission line from the factual power of the selected power supply 21 to obtain an efficient power, and divides the output power by the efficient power to obtain the sum efficiency of the selected power supply and transmission line.

In step S304, the display control module 40 displays a prompt to prompt the user whether to select a next power supply 21 or not, and determines whether it is needed to select a next power supply 21 according to the user's selection. If the display control module 40 determines it is needed to select a next power supply 21, the process returns to S302, then the input determining module 20 obtains power supply parameters and transmission line parameter selected by the user again when determining the user has finished the selection once again.

If the display control module 40 determines that it is not needed to select a next power supply 21, in step S305, the calculating module 30 calculates a total efficiency of the power supply system 2 according to the sum efficiencies of each selected power supply and transmission line. In detail, the calculating module 30 multiplies the sum efficiencies of each selected power supply and transmission line to obtain the total efficiency of the power supply system 2.

In the embodiment, the method can further include steps: the display control module 40 displays the sum efficiency after the calculating module 30 has calculated the sum efficiency, and displays the total efficiency on the display unit 13 after the calculating module 30 has calculated the total efficiency.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being exemplary embodiments of the present disclosure.

What is claimed is:

1. An electronic device for calculating efficiency of a simulative power supply system, the simulative power supply system comprising at least one power supply, the electronic device comprising:
   a storage unit storing a relationship table, wherein, the relationship table defines relationships between a plurality of power supplies and efficiencies associated with each of the power supplies;
   a display unit; and
   a processing unit comprising:
      an interface providing module, configured to display a parameter selection interface on the display unit for selecting power supply parameters and transmission line parameters by a user;
      an input determining module, configured to obtain the selected power supply parameters and the selected transmission line parameters selected by the user via the parameter selection interface when determining that a selection of the power supply parameters and the transmission line parameters is finished, wherein, the selected power supply parameters comprise a selected power supply, an output power of the selected power supply, and an output voltage of the selected power supply, and the selected transmission line parameters comprises a selected transmission line, and corresponding parameters of the selected transmission line;
      a calculating module, configured to determine an efficiency of the selected power supply according to the relationship table, and calculate a sum efficiency of the selected power supply and transmission line according to the obtained power supply parameters, the obtained transmission line parameters, and the efficiency of the selected power supply; and
      a display control module, configured to display a prompt on the display unit to prompt the user whether to select a next power supply or not, and determine whether it is needed to select the next power supply according to the user's selection;
   wherein, the calculating module is further configured to calculate a total efficiency of the simulative power supply system according to the sum efficiencies of each selected power supply and transmission line when the display control module determines that it is not needed to select the next power supply.

2. The electronic device according to claim 1, wherein the parameter selection interface comprises a power supply parameter selection area and a transmission line parameter selection area, the power supply parameter selection area comprises a power supply selection box, an output power selection box, and an output voltage selection box; the transmission line parameter selection area comprises a transmission line selection box and a plurality of parameter selection boxes corresponding to a type of a transmission line selected by the user via the transmission line selection box.

3. The electronic device according to claim 2, the power supply selection box is provided for selecting the different types of power supplies, the output power selection box is provided for selecting the output powers of the selected power supply, the output voltage selection box is provided for selecting the output voltage of the selected power supply; the transmission line selection box is provided for selecting the different types of transmission lines, the plurality of parameter selection boxes are provided for selecting the corresponding parameters of the selected transmission line.

4. The electronic device according to claim 3, wherein the calculating module calculates a resistance value of the transmission line according to the parameter, and calculates a loss of the transmission line according to an output voltage selected by the user via the output voltage selection box and the resistance value of the transmission line; the calculating module further multiplies the output power selected by the user and the efficiency corresponding to the power supply to obtain a factual power of the power supply selected by the user, and subtracts the loss of the transmission line from the factual power of the selected power supply to obtain an efficient power, and divides the output power by the efficient power to obtain the sum efficiency of the selected power supply and transmission line.

5. The electronic device according to claim 1, wherein the display control module is further configured to display the sum efficiency after the calculating module has calculated the sum efficiency, and display the total efficiency on the display unit after the calculating module has calculated the total efficiency.

6. The electronic device according to claim 1, wherein the calculating module multiplies the sum efficiencies of each selected power supply and transmission line to obtain a total efficiency of the simulative power supply system.

7. The electronic device according to claim 1, wherein the parameter selection interface further comprises a confirmation button, the input determining module determines the selection of the power supply parameters and the transmission line parameters is finished, when detecting the confirmation button has been operated by the user.

8. The electronic device according to claim 1, wherein the parameter selection interface further comprises a product information box for displaying relative information of the selected power supply.

9. The electronic device according to claim 1, wherein the electronic device is one selected from the group consist of a computer, a mobile phone, and an electronic reader.

10. A method for calculating efficiency of a power supply system, the method is applied in an electronic device of claim 1, the electronic device comprises:
    a storage unit storing a relationship table, wherein, the relationship table defines relationships between plurality of power supplies and efficiencies associated with each of the power supplies; and a display unit;

the method comprising:

displaying a parameter selection interface on the display unit for selecting power supply parameters and transmission line parameters by a user;

obtaining the selected power supply parameters and the selected transmission line parameters selected by the user via the parameter selection interface when determining that a selection of the power supply parameters and the transmission line parameters is finished, wherein, the selected power supply parameters comprise a selected power supply, an output power of the selected power supply, and an output voltage of the selected power supply, and the selected transmission line parameters comprises a selected transmission line, and corresponding parameters of the selected transmission line;

determining a efficiency of the selected power supply according to the relationship table, and calculating a sum efficiency of the selected power supply and transmission line according to the obtained power supply parameters and the transmission line parameters, and the efficiency of the selected power supply;

displaying a prompt on the display unit to prompt the user whether to select a next power supply or not and determining whether it is needed to select the next power supply according to user's selection; and calculating a total efficiency of the power supply system according to the sum efficiencies of each selected power supply and transmission line when determining it is not needed to select the next power supply.

11. The method according to claim 10, wherein the step of "calculating a sum efficiency of the selected power supply and transmission line according to the obtained power supply parameters and the transmission line parameters, and the efficiency of the selected power supply" comprises:

calculating a resistance value of the transmission line according to the transmission line parameter;

calculating a loss of the transmission line according to the output voltage selected by the user and the resistance value of the transmission line;

multiplying the output power selected by the user and the efficiency corresponding to the power supply to obtain a factual power of the power supply selected by the user;

subtracting the loss of the transmission line from the factual power of the selected power supply to obtain an efficient power; and dividing the output power by the efficient power to obtain the sum efficiency of the selected power supply and transmission line.

12. The method according to claim 10, wherein the step of "calculating a total efficiency of the power supply system according to the sum efficiencies of each selected power supply and transmission line" comprises:

multiplying the sum efficiencies each selected power supply and transmission line to obtain a total efficiency of the power supply system.

13. The method according to claim 10, wherein the step of "obtaining the selected power supply parameters and the selected transmission line parameters selected by the user via the parameter selection interface when determining that a selection of the power supply parameters and the transmission line parameters is finished" comprises:

determining the selection of the power supply parameters and the transmission line parameters is finished when detecting a confirmation button has been operated by the user; and obtaining the selected power supply parameters and the selected transmission line parameters selected by the user via the parameter selection interface.

14. The method according to claim 10, further comprising:

displaying the sum efficiency after the calculating module has calculated the sum efficiency; and displaying the total efficiency on the display unit after the calculating module has calculated the total efficiency.

* * * * *